US008623980B2

(12) United States Patent
Lohse et al.

(10) Patent No.: US 8,623,980 B2
(45) Date of Patent: Jan. 7, 2014

(54) PROCESS FOR MAKING A SATURATED DENDRITIC HYDROCARBON POLYMER

(75) Inventors: David John Lohse, Bridgewater, NJ (US); Nikos Hadjichristidis, Athens (GR); Andy Haishung Tsou, Allentown, PA (US); Pamela J. Wright, Easton, PA (US); Suzzy Chen Hsi Ho, Princeton, NJ (US); Paul Edward Schuenzel, Morris Plains, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 154 days.

(21) Appl. No.: 13/329,559

(22) Filed: Dec. 19, 2011

(65) Prior Publication Data

US 2012/0157633 A1 Jun. 21, 2012

Related U.S. Application Data

(60) Provisional application No. 61/425,486, filed on Dec. 21, 2010.

(51) Int. Cl.
| C08L 9/00 | (2006.01) |
| C08L 23/00 | (2006.01) |
| C08F 36/00 | (2006.01) |
| C08F 136/00 | (2006.01) |
| C08F 136/06 | (2006.01) |

(52) U.S. Cl.
USPC ............ 526/335; 526/340.1; 526/340.4; 525/232; 525/240

(58) Field of Classification Search
USPC ............ 526/335, 340.1, 340.4; 525/232, 240
See application file for complete search history.

(56) References Cited

U.S. PATENT DOCUMENTS

| 5,663,239 | A * | 9/1997 | Coolbaugh et al. ............ 525/314 |
| 6,391,998 | B1 | 5/2002 | Garcia-Franco et al. |
| 6,417,281 | B1 | 7/2002 | Garcia-Franco et al. |
| 7,619,036 | B2 * | 11/2009 | Mays et al. ............ 525/64 |
| 7,687,580 | B2 | 3/2010 | Lohse et al. |
| 2009/0163666 | A1 | 6/2009 | Lohse et al. |
| 2011/0118420 | A1 | 5/2011 | Lohse et al. |

FOREIGN PATENT DOCUMENTS

| WO | 9744371 | 11/1997 |
| WO | 0014129 | 3/2000 |

OTHER PUBLICATIONS

Nikos Hadjichristidis et al., "Well-Defined, Model Long Chain Branched Polyethylene. 1: Synthesis and Characterization", Macromolecules, vol. 33, No. 7, Apr. 4, 2000, pp. 2424-2436.

Jung Hun Lee et al., "Linear and Nonlinear Rheology of Dendritic Star Polymers: Experiment", vol. 41, No. 23, Dec. 9, 2008, pp. 9165-9178.

D.J. Lohse, S.T. Milner, L.J. Fetters, M. Xenidou, N. Hadjichristidis, R.A. Mendelson, C.A. Garcia-Franco and M.K. Lyon, Well-Defined, Model Long Chain Branched Polyethylene. 2. Melt Rheological Behavior, Macromolecules, 2002, 35, 3066-3075.

N. Hadjichristidis, M. Xenidou, H. Iatrou, M. Pitsikalis, Y. Poulos, A. Avgeropoulos, S. Sioula, S. Paraskeva, G. Velis, D.J. Lohse, D.N. Shulz, L.J. Fetters, P.J. Wright, R.A. Mendelson, C.A. Garcia-Franco, T. Sun and C.J. Ruff, "Well Defined, Model Long Chain Branched Polyethylene. 1. Synthesis and Characterization", Macromolecules, 2000, 33, 2424-2436.

G. Koutalas, H. Iatrou, D.J. Lohse and N. Hadjichristidis, "Well-Defined Comb, Star-Comb, and Comb-on-Comb Polybutadienes by Anionic Polymerization of the Macromonomer Strategy", Macromolecules, 2005, 38, 4996-5001.

G. Koutalas, D.J. Lohse and N. Hadjichristidis, "Novel Block-Comb/Graft Copolymers with the Macromonomer Strategy and Anionic Polymerization", Journal of Polymer Science: Part A: Polymer Chemistry, 2005, vol. 43, 4040-4049.

P. Driva, H. Iatrou, D.J. Lohse and N. Hadjichristidis, "Anionic Homo- and Copolymerization of Double-Tailed Macromonomers: A Route to Novel Macromolecular Architectures", Journal of Polymer Science: Part A: Polymer Chemistry, 2005, vol. 43, 4070-4078.

K. Orfanou, H. Iatrou, D.J. Lohse and N. Hadjichristidis, "Synthesis of Well-Defined Second (G-2) and Third (G-3) Generation Dendritic Polybutadienes", Macromolecules, 2006, 39, 4361-4365.

M. Kapnistos, G. Koutalas, N. Hadjichristidis, J. Roovers, D.J. Lohse and D. Vlassopoulos, "Linear rheology of comb polymers with star-like backbones: melts and solutions", Rheol. Acta, 2006, 46, 273-286.

E. van Ruymbeke, K. Orfanou, M. Kapnistos, H. Iatrou, M. Pitsikalis, N. Hadjichristidis, D.J. Lohse and D. Vlassopoulos, "Entangled Dendritic Polymers and Beyond: Rheology of Symmetric Cayley-Tree Polymers and Macromolecular Self-Assemblies", Macromolecules, 2007, 40, 5941-5952.

(Continued)

Primary Examiner — Nathan M Nutter
(74) Attorney, Agent, or Firm — Robert A. Migliorini

(57) ABSTRACT

A process for making a substantially saturated dendritic hydrocarbon polymer. The process has the following steps: (a) polymerizing an amount of a first alkadiene monomer under anionic conditions in the presence of a first organic monolithium initiator to produce a linear polyalkadiene having a lithiated chain end; (b) reacting the linear polyalkadiene with an amount of a second organic monolithium initiator in the presence of tetramethylethylene diamine to form a multilithiated polyalkadiene; (c) reacting the multilithiated polyalkadiene with an amount of a second alkadiene monomer to form a branched polyalkadiene; (d) repeating steps (b) and (c) with the branched polyalkadiene one or more times to prepare a dendritic polyalkadiene; and (e) hydrogenating the dendritic polyalkadiene to form the substantially saturated dendritic hydrocarbon polymer.

9 Claims, 8 Drawing Sheets

(56) References Cited

OTHER PUBLICATIONS

P. Driva, D.J. Lohse and N. Hadjichristidis, "Well-Defined Complex Macromolecular Architectures by Anionic Polymerization of Styrenic Single and Double Homo/Miktoarm Star-Tailed Macromonomers", Journal of Polymer Science: Part A: Polymer Chemistry, 2008, vol. 46, 1826-1842.

J.H. Lee, K. Orfanou, P. Driva, H. Iatrou, N. Hadjichristidis and D.J. Lohse, "Linear and Nonlinear Rheology of Dendritic Star Polymers: Experiment", Macromolecules, 2008, 41, 9165-9178.

J.H. Lee, P. Driva, N. Hadjichristidis, P.J. Wright, S.P. Rucker and D.J. Lohse, "Damping Behavior of Entangled Comb Polymers: Experiment", Macromolecules, 2009, 42, 1392-1399.

A. Nikopoulou, H. Iatrou, D.J. Lohse, N. Hadjichristidis, "Synthesis of Exact Comb Polybutadienes with Two and Three Branches", Journal of Polymer Science: Part A: Polymer Chemistry, 2009, vol. 47, 2597-2607.

\* cited by examiner

PROCESS FOR MAKING A SATURATED DENDRITIC HYDROCARBON POLYMER

CROSS-REFERENCE TO RELATED APPLICATIONS

This application claims priority to U.S. Provisional Application Ser. No. 61/425,486 filed Dec. 21, 2010, herein incorporated by reference in its entirety.

FIELD

The present disclosure relates to a process for making a substantially saturated dendritic hydrocarbon polymer. The present disclosure also relates to a polymer blend having the substantially saturated dendritic hydrocarbon polymer. The present disclosure further relates to an article formed from the blend.

BACKGROUND

Polymers that have long-chain branching (LCB), i.e., long enough to result in entanglement, have qualitatively different flow behavior than polymers that are purely linear. LCB profoundly affects the processing and crystallization of the branched polymers. As such, it is often desirable to design polymers with an optimal amount and type of LCB to achieve a particular set of processing characteristics and physical properties.

Some conventional forms of polyethylene, such as LDPE produced by high pressure free radical processes, contain a broad mix of LCB. More recently, other forms of polyethylene produced using metallocenes and other single-site coordination catalysts have a variety of different types of LCB. However, most polyethylenes with LCB are only one generation away from the linear backbone and have very limited branch density. The effectiveness of those polyethylenes with LCB in use as additives in modifying the flow properties of polyethylene without LCB has been limited.

Polyethylenes having a high degree of branching, such as dendritic or multi-generation, branch-on-branch polymers might be particularly useful as additives in modifying the flow properties of non-LCB polyethylenes. However, synthesis of such highly branched polyethylenes is typically laborious and expensive.

It would be desirable to have a useful, inexpensive additive that would have a significant impact on the processing and performance balance of conventional polymers, particularly polyethylenes such as LDPE.

SUMMARY

According to the present disclosure, there is provided a process for making a substantially saturated dendritic hydrocarbon polymer. The process has the following steps: (a) polymerizing an amount of a first alkadiene monomer under anionic conditions in the presence of a first organic monolithium initiator to produce a linear polyalkadiene having a lithiated chain end; (b) reacting the linear polyalkadiene with an amount of a second organic monolithium initiator in the presence of tetramethylethylene diamine to form a multilithiated polyalkadiene; (c) reacting the multilithiated polyalkadiene with an amount of a second alkadiene monomer to form a branched polyalkadiene; (d) repeating steps (b) and (c) with the branched polyalkadiene one or more times to prepare a dendritic polyalkadiene; and (e) hydrogenating the dendritic polyalkadiene to form the substantially saturated dendritic hydrocarbon polymer.

Further according to the present disclosure, there is provided a polymer blend. The polymer blend has a matrix polymer and the substantially saturated dendritic hydrocarbon polymer described above. The matrix polymer is present in a greater weight proportion than the substantially saturated dendritic hydrocarbon polymer.

DETAILED DESCRIPTION

Figure 1:
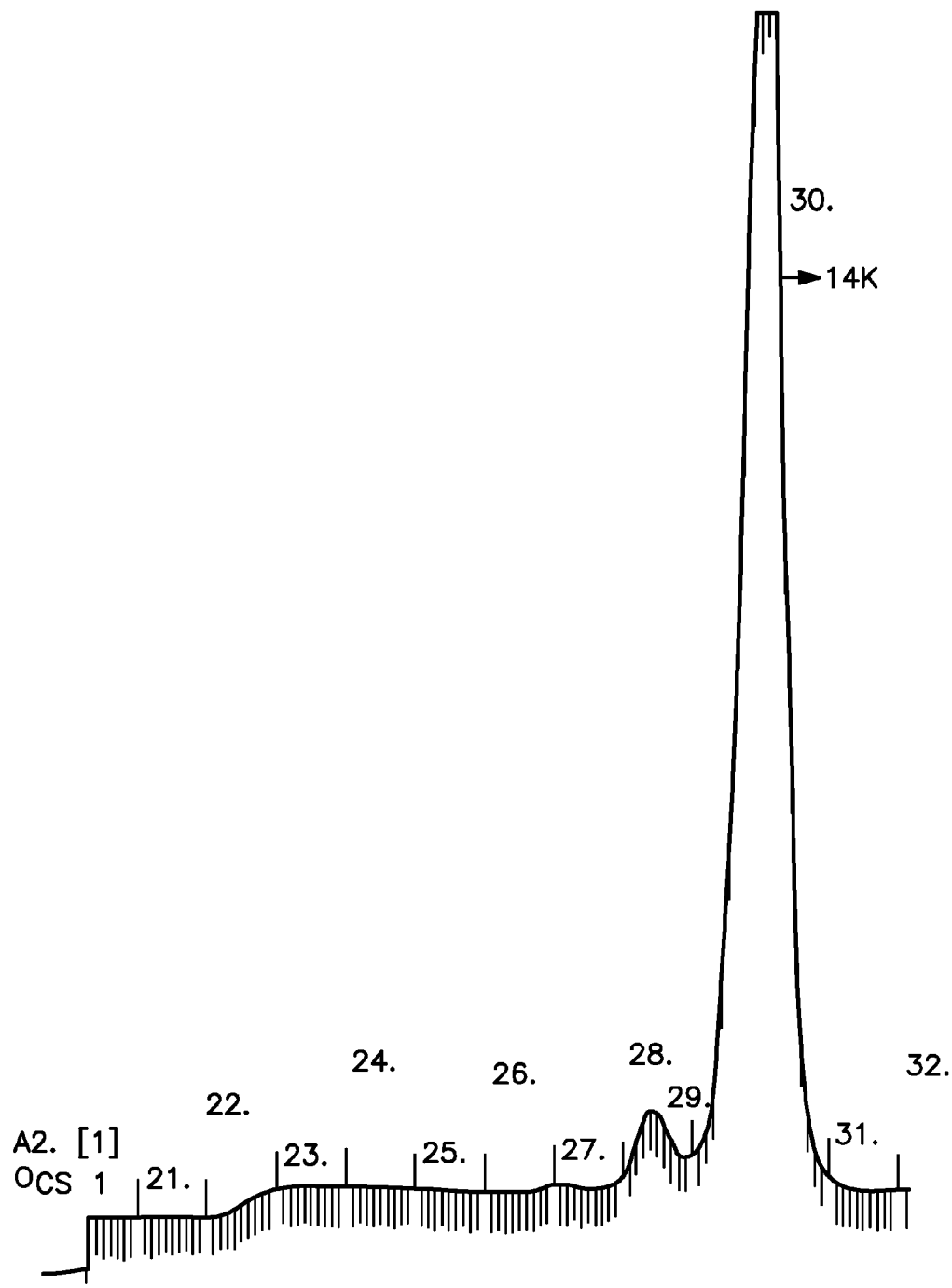
FIG. 1 is a representation of a chromatogram of a linear PBd polymer with lithiated chain end.

All numerical values within the detailed description and the claims herein are modified by "about" or "approximately" the indicated value, and take into account experimental error and variations that would be expected by a person having ordinary skill in the art.

The process of the present disclosure provides a process for making substantially saturated, graft-on-graft, dendritic hydrocarbon polymers. The process is economical compared to previous processes while affording a high degree of control with respect to polymer architecture. The graft-on-graft dendritic polymers are useful as rheology-modifying blend additives in the manufacture of polymer materials and compositions and in modification of the end-product properties.

The following structures are examples of structural representations of polymers with graft-on-graft architecture that can be obtained by the process of the present disclosure. The polymers physically resemble some of the most highly branched molecules found in low density polyethylene (LDPE) produced in high pressure (HP) processes, albeit with lower branching density. An example of a first-generation (G1) structure is shown below:

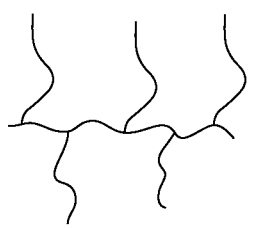

An example of a second-generation (G2) structure is shown below:

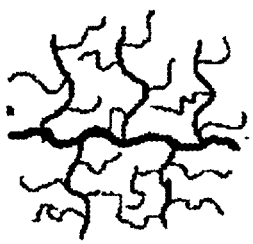

In the first step of the present disclosure, alkadienes are polymerized anionically using monofunctional organic lithium initiators.

$$CH_2=CH-CH=CH_2$$
Butadiene-1,3

↓ sec BuLi

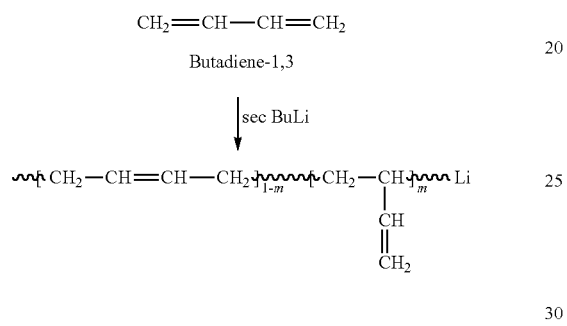

The second step is lithiation with an organic lithium initiator in the presence of TMEDA:

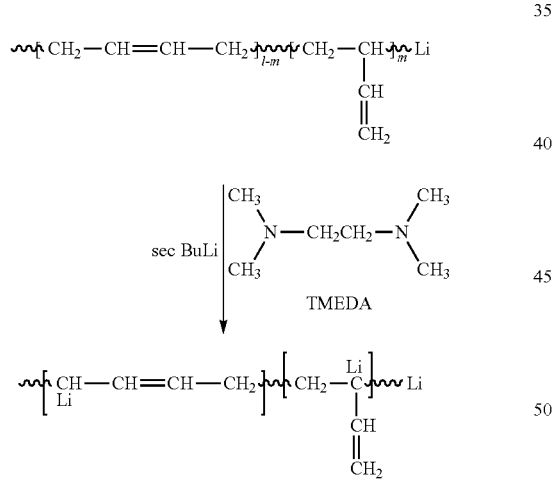

The third step is further anionic polymerization of alkadienes from the several Li sites on the chains:

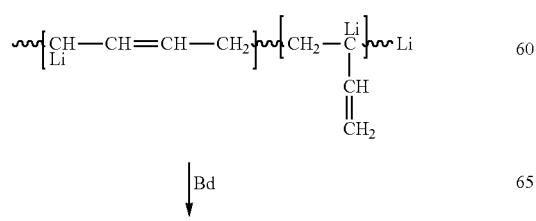

↓ Bd

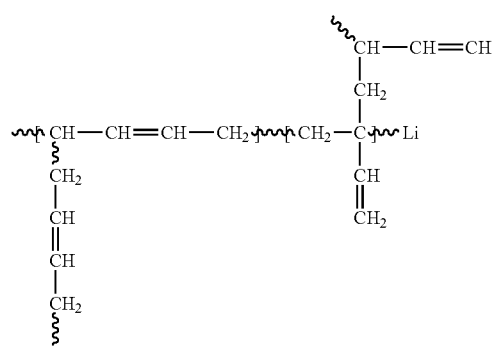

or represented structurally:

↓ Bd

The polymer product represented above is a second-generation dendritic polymer (first generation graft-on-graft).

Steps two and three can then be repeated to make a third-generation dendritic structure (or second generation graft-on-graft) as follows:

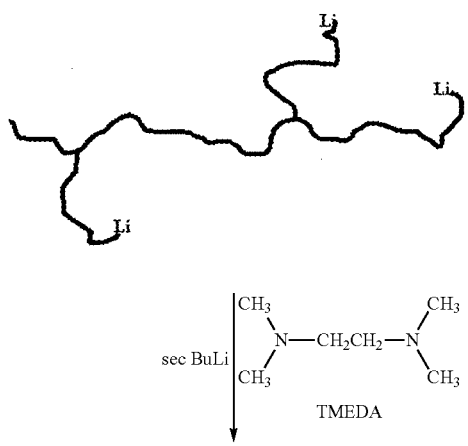

-continued

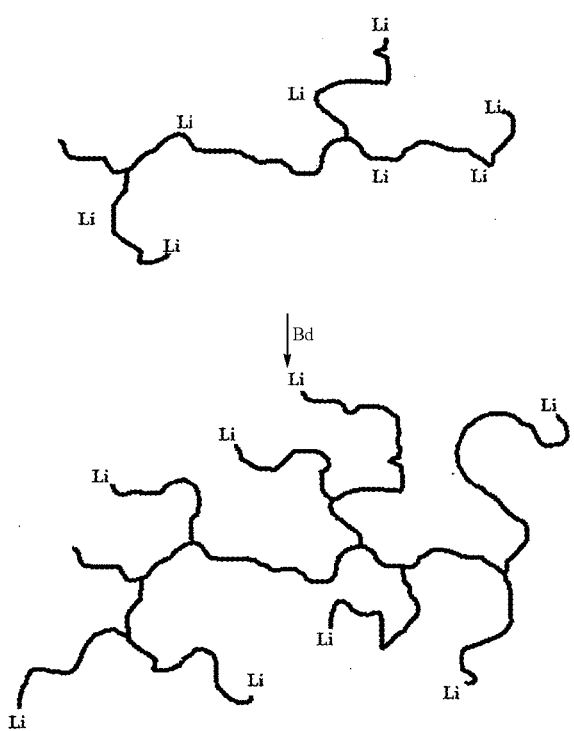

The foregoing structure illustrates the synthesis of a third-generation dendritic polymer, but fourth and fifth generation polymers (and beyond) are possible via one or more additional cycles of multilithiation followed by additional butadiene polymerization. Upon the completion of butadiene polymerization, the polymer is quenched by the addition of an alcohol (methanol, isopropyl alcohol, or similar) and then hydrogenated to complete substantial saturation of the final dendritic polymer product.

The molecular weight of the branches of the dendritic polymer grows with each cycle. Once hydrogenated, the branches need to be longer than the entanglement molecular weight of the polymer. For polyethylene, this is 1 kg/mol, but if they are very long the viscosity of the polymer may rise too much. Most preferably, the $M_w$ of the branches is 5 kg/mol. This level also allows a fairly rapid reaction rate in solution to make the random dendritic structures. To make similar polymers for dendritic ethylene/propylene copolymers, a most preferred $M_w$ for the chains is higher, 13 kg/mol.

The process uses a 1,3-alkadienes(s) as a starting material. The alkadienes can be chosen from the group of unsaturated organic compounds that can be polymerized anionically (i.e., in a reaction initiated by an organo-alkali metal). Examples of conjugated diene hydrocarbons include, but are not limited to, 1,3-butadiene, isoprene, 2-methyl-1,3-pentadiene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, and combinations thereof.

The 1,3-dienes may be polymerized singly, or in admixture with each other or with other dienes to form random or tapered copolymers. Alternately, compounds may be sequentially charged to a reaction mixture to form block copolymers.

Substituting other diene monomers for the butadiene can result in saturated hydrocarbon dendritic polymers of polyolefins other than polyethylene. For instance, if 2-methyl-1,3-pentadiene is used as the monomer, the polymer that is made has a repeat unit of atactic polypropylene. If isoprene is the monomer, the repeat unit of the polymer is that of an alternating ethylene-propylene copolymer. Thus, the use of any diene that can be polymerized anionically can produce useful polymers by the procedures outlined herein.

Anionic polymerization can be carried out either under vacuum (see N. Hadjichristidis, H. Iatrou, S. Pispas, M. Pitsikalis "Anionic polymerization: High vacuum techniques" *J. Polym Sci A: Polym Chem* 38, 3211(2000) or under argon (Duward F. Shriver and M. A. Drezdzon, "The Manipulation of Air-Sensitive Compounds", 1986, J. Wiley and Sons: New York) using well known practices. Alkyl hydrocarbon, cyclic (e.g. cyclohexane, cyclopentane) or non-cyclic (e.g. hexane, heptane, octane), as well as aromatic hydrocarbon (e.g. toluene, xylene) can be used as polymerization solvents). If necessary a microstructure modifier can be added.

The polymers of the present invention can be prepared with known metallic and organometallic catalysts such as lithium metal or sodium metal and organo-lithium and organo-sodium catalysts. Suitable organo-lithium catalysts may be represented by the formula RLi, wherein R is a $C_3$ to $C_{30}$, and preferably a $C_3$ to $C_{10}$, alkyl, arakyl, or cycloalkyl group. Specific examples of suitable catalysts include n-propyl lithium, isopropyl lithium, n-butyl lithium, tertiary butyl lithium, 2-ethyl hexyl lithium, n-decyl lithium, benzyl lithium, 4-phenyl-n-butyl lithium, and mixtures thereof. Particularly preferred are the butyl lithiums, i.e., normal-, secondary-, iso-, and tertiary-butyl lithiums.

Hydrogenation can be carried out in the process of the present invention by any known catalysis system, including heterogeneous systems and soluble systems. Soluble systems are disclosed in U.S. Pat. No. 4,284,835 at column 1, line 65 through column 9, line 16 as well as U.S. Pat. No. 4,980,331 at column 3 line 40 through column 6, line 28.

Additional teachings to hydrogenation are seen in Rachapudy et al., Journal of Polymer Science: Polymer Physics Edition, Vol. 17, 1211-1222 (1979), which is incorporated herein by reference in its entirety. Table 1 of the article discloses several systems including palladium on various supports (calcium carbonate, but also barium sulfide). The Rachapudy et al. article discloses preparation of homogeneous catalysts and heterogeneous catalysts.

The Rachapudy et al. article discloses a method of preparation of a homogeneous hydrogenation catalyst. The catalyst can be formed by reaction between a metal alkyl and the organic salt of a transition metal. The metal alkyls were n-butyl lithium (in cyclohexane) and triethyl aluminum (in hexane). The metal salts were cobalt and nickel 2-ethyl hexanoates (in hydrocarbon solvents) and platinum and palladium acetyl-acetonates (solids). Hydrogenation was conducted in a 1-liter heavy-wall glass reactor, fitted with a stainless steel flange top and magnetically stirred. A solution of 5 grams of polybutadiene in 500 ml of dry cyclohexane was added, and the reactor was closed and purged with nitrogen. The catalyst complex was prepared separately by adding the transition metal salt to the metal alkyl in cyclohexane under nitrogen. The molar ratio of component metals (alkyl to salt) was generally 3.5/1, the optimum in terms of rate and completeness of hydrogenation. The reactor was heated to 70° C., purged with hydrogen, and the catalyst mixture (usually 0.03 moles of transition metal per mole of double bonds) injected through a rubber septum. Hydrogen pressure was increased to 20 psi (gauge) and the reaction allowed to proceed for approximately 4 hours. Hydrogenation proceeds satisfactorily in the initial stages even at room temperature, but the partially hydrogenated polymer soon begins to crystallize. At 70° C., the polymer remains in solution throughout the reaction.

After hydrogenation, the catalyst was decomposed with dilute HCl. The polymer was precipitated with methanol, washed with dilute acid, re-dissolved, re-precipitated and dried under vacuum. Blank experiments with polyethylene in place of polybutadiene confirmed that the washing procedure was sufficient to remove any uncombined catalyst decomposition products.

The Rachapudy et al. article also discloses a method of preparation of a heterogeneous hydrogenation catalyst. A 1-liter high-pressure reactor (Parr Instrument Co.) was used. The catalysts were nickel on kieselguhr (Girdler Co.) and palladium on calcium carbonate (Strem Chemical Co.). Approximately 5 grams of polybutadiene were dissolved in 500 ml of dry cyclohexane, the catalyst was added (approximately 0.01 moles metal/mole of double bonds), and the reactor was purged with hydrogen. The reactor was then pressurized with hydrogen and the temperature raised to the reaction temperature for 3 to 4 hours. For the nickel catalyst, the reaction conditions were 700 psi $H_2$ and 160° C. For palladium, the conditions were 500 psi $H_2$ and 70° C. After reaction the hydrogen was removed and the solution filtered at 70° C. The polymer was precipitated with methanol and dried under vacuum.

The catalysts described herein can be used to hydrogenate hydrocarbons containing unsaturated carbon bonds. The unsaturated carbon bonds which may be hydrogenated include olefinic and acetylenic unsaturated bonds. The process is particularly suitable for the hydrogenation under mild conditions of hydrogenatable organic materials having carbon-to-carbon unsaturation, such as acyclic monoolefins and polyolefins, cyclic monoolefins and polyolefins and mixtures thereof. These materials may be unsubstituted or substituted with additional non-reactive functional groups such as halogens, ether linkages or cyano groups. Exemplary of the types of carbon-to-carbon compounds useful herein are hydrocarbons of 2 to 30 carbon atoms, e.g., olefinic compounds selected from acyclic and cyclic mono-, di- and triolefins. The catalysts of this invention are also suitable for hydrogenating carbon-to-carbon unsaturation in polymeric materials, for example, in removing unsaturation from butadiene polymers and co-polymers such as styrene-butadiene-styrene.

The hydrogenation reaction herein is normally accomplished at a temperature from 40° C. to 160° C. and preferably from 60° C. to 150° C. Different substrates being hydrogenated will require different optimum temperatures, which can be determined by experimentation. The initial hydrogenation pressures may range up to 3,000 psi partial pressure, at least part of which is present due to the hydrogen. Pressures from 1 to 7500 psig are suitable. Preferred pressures are up to 2000 psig, and most preferred pressures are from 100 to 1000 psig are employed. The reactive conditions are determined by the particular choices of reactants and catalysts. The process may be either batch or continuous. In a batch process, reaction times may vary widely, such as between 0.01 second to 10 hours. In a continuous process, reaction times may vary from 0.1 seconds to 120 minutes and preferably from 0.1 second to 10 minutes.

The ratio of catalyst to material being hydrogenated is generally not critical and may vary widely within the scope of the invention. Molar ratios of catalyst to material being hydrogenated between 1:1000 and 10:1 are found to be satisfactory; higher and lower ratios, however, are possible.

If desired, the hydrogenation process may be carried out in the presence of an inert diluent, for example a paraffinic or cycloparaffinic hydrocarbon.

Additional teachings to hydrogenation processes and catalysts are disclosed in U.S. Pat. No. 4,980,331, which is incorporated herein by reference in its entirety.

In general, any of the Group VIII metal compounds known to be useful in the preparation of catalysts for the hydrogenation of ethylenic unsaturation can be used separately or in combination to prepare the catalysts. Suitable compounds, then, include Group VIII metal carboxylates having the formula $(RCOO)_nM$, wherein M is a Group VIII metal, R is a hydrocarbyl radical having from 1 to 50 carbon atoms, preferably from 5 to 30 carbon atoms, and n is a number equal to the valence of the metal M; alkoxides having the formula $(RCO)_nM$, wherein M is again a Group VIII metal, R is a hydrocarbon radical having from 1 to 50 carbon atoms, preferably from 5 to 30 carbon atoms, and n is a number equal to the valence of the metal M; chelates of the metal prepared with beta-ketones, alpha-hydroxycarboxylic acids beta-hydroxycarboxylic acids, beta-hydroxycarbonyl compounds and the like; salts of sulfur-containing acids having the general formula $M(SO_x)_n$ and partial esters thereof; and salts of aliphatic and aromatic sulfonic acids having from 1 to 20 carbon atoms. Preferably, the Group VIII metal will be selected from the group consisting of nickel and cobalt. Most preferably, the Group VIII metal will be nickel. The metal carboxylates useful in preparing the catalyst include Group VIII metal salts of hydrocarbon aliphatic acids, hydrocarbon cycloaliphatic acids and hydrocarbon aromatic acids.

Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, and rhodinic acid. Examples of hydrocarbon aromatic acids include benzoic acid and alkyl-substituted aromatic acids in which the alkyl substitution has from 1 to 20 carbon atoms. Examples of cycloaliphatic acids include naphthenic acid, cyclohexylcarboxylic acid, and abietic-type resin acids.

Suitable chelating agents which may be combined with various Group VIII metal compounds thereby yielding a Group VIII metal chelate compound useful in the preparation of the catalyst include beta-ketones, alpha-hydroxycarboxylic acids, beta-hydroxy carboxylic acids, and beta-hydroxycarbonyl compounds. Examples of beta-ketones that may be used include acetylacetone, 1,3-hexanedione, 3,5-nonadione, methylacetoacetate, and ethylacetoacetate. Examples of alpha-hydroxycarboxylic acids that may be used include lactic acid, glycolic acid, alpha-hydroxyphenylacetic acid, alpha-hydroxy-alpha-phenylacetic acid, and alpha-hydroxycyclohexylacetic acid. Examples of beta-hydroxycarboxylic acids include salicylic acid, and alkyl-substituted salicyclic acids. Examples of beta-hydroxylcarbonyl compounds that may be used include salicylaldehyde, and θ-hydroxyacetophenone.

The metal alkoxides useful in preparing the catalysts include Group VIII metal alkoxides of hydrocarbon aliphatic alcohols, hydrocarbon cycloaliphatic alcohols and hydrocarbon aromatic alcohols. Examples of hydrocarbon aliphatic alcohols include hexanol, ethylhexanol, heptanol, octanol, nonanol, decanol, and dodecanol. The Group VIII metal salts of sulfur-containing acids and partial esters thereof include Group VIII metal salts of sulfonic acid, sulfuric acid, sulphurous acid, and partial esters thereof. Of the sulfonic acids, aromatic sulfonic acids such as benzene sulfonic acid, p-toluene sulfonic acid, are particularly useful.

In general, any of the alkylalumoxane compounds known to be useful in the preparation of olefin polymerization catalysts may be used in the preparation of the hydrogenation catalyst. Alkylalumoxane compounds useful in preparing the catalyst may, then, be cyclic or linear. Cyclic alkylalumoxanes may be represented by the general formula $(R—Al—O)_m$ while linear alkylalumoxanes may be represented by the general formula $R(R—Al—O)_n AlR_2$. In both of the general formulae R will be an alkyl group having from 1 to 8 carbon atoms such as, for example, methyl, ethyl, propyl, butyl, and pentyl, m is an integer from 3 to 40, and n is an integer from 1 to 40. In a preferred embodiment, R will be methyl, m will be a number from 5 to 20 and n will be a number from 10 to 20. As is well known, alkylalumoxanes may be prepared by reacting an aluminum alkyl with water. Usually the resulting product will be a mixture of both linear and cyclic compounds.

Contacting of the aluminum alkyl and water may be accomplished in several ways. For example, the aluminum alkyl may first be dissolved in a suitable solvent such as toluene or an aliphatic hydrocarbon and the solution then contacted with a similar solvent containing relatively minor amounts of moisture. Alternatively, an aluminum alkyl may be contacted with a hydrated salt, such as hydrated copper sulfate or ferrous sulfate. When this method is used, a hydrated ferrous sulfate is frequently used. According to this method, a dilute solution of aluminum alkyl in a suitable solvent such as toluene is contacted with hydrated ferrous sulfate. In general, 1 mole of hydrated ferrous sulfate will be contacted with from 6 to 7 moles of the aluminum trialkyl. When aluminum trimethyl is the aluminum alkyl actually used, methane will be evolved as conversion of the aluminum alkyl to an alkylalumoxane occurs.

In general, any of the Group Ia, IIa or IIIa metal alkyls or hydrides known to be useful in preparing hydrogenation catalysts in the prior art may be used to prepare the catalyst. In general, the Group Ia, IIa or IIIa metal alkyls will be peralkyls with each alkyl group being the same or different containing from 1 to 8 carbon atoms and the hydrides will be perhydrides although alkylhydrides should be equally useful. Aluminum, magnesium and lithium alkyls and hydrides are particularly useful and these compounds are preferred for use in preparing the catalyst. Aluminum trialkyls are most preferred.

The one or more alkylalumoxanes and the one or more Group Ia, IIa or IIIa metal alkyls or hydrides may be combined and then contacted with the one or more Group VIII metal compounds or the one or more alkylalumoxanes and the one or more Group Ia, IIa or IIIa metal alkyls or hydrides may be sequentially contacted with the one or more Group VIII metal compounds with the proviso that when sequential contacting is used, the one or more alkylalumoxanes will be first contacted with the one or more Group VIII metal compounds. Sequential contacting is preferred. With respect to the contacting step the two different reducing agents; i.e., the alkylalumoxanes and the alkyls or hydrides, might react with the Group VIII metal compound in such a way as to yield different reaction products. The Group Ia, IIa and IIIa metal alkyls and hydrides are a stronger reducing agent than the alkylalumoxanes, and, as a result, if the Group VIII metal is allowed to be completely reduced with a Group Ia, IIa or IIIa metal alkyl or hydride, the alkylalumoxanes might make little or no contribution. If the Group VIII metal is first reduced with one or more alkylalumoxanes, however, the reaction product obtained with the alumoxane might be further reduced or otherwise altered by reaction with a Group Ia, IIa or IIIa metal alkyl or hydride. Whether contacting is accomplished concurrently or sequentially, the one or more alkylalumoxanes will be combined with the one or more Group VIII metal compounds at a concentration sufficient to provide an aluminum to Group VIII metal atomic ratio within the range from 1.5:1 to 20:1 and the one or more Group Ia, IIa or IIIa metal alkyls or hydrides will be combined with one or more Group VIII metal compounds at a concentration sufficient to provide a Group Ia, IIa or IIIa metal to Group VIII metal atomic ratio within the range from 0.1:1 to 20:1. Contact between the one or more Group VIII compounds and the one or more alkylalumoxanes and the one or more alkyls or hydrides will be accomplished at a temperature within the range from 20° C. and 100° C. Contact will typically be continued for a period of time within the range from 1 to 120 minutes. When sequential contacting is used, each of the two contacting steps will be continued for a period of time within this same range.

In general, the hydrogenation catalyst will be prepared by combining the one or more Group VIII metal compounds with the one or more alkylalumoxanes and the one or more Group Ia, IIa or IIIa metal alkyls or hydrides in a suitable solvent. In general, the solvent used for preparing the catalyst may be anyone of those solvents known in the prior art to be useful as solvents for unsaturated hydrocarbon polymers. Suitable solvents include aliphatic hydrocarbons, such as hexane, heptane, and octane, cycloaliphatic hydrocarbons such as cyclopentane, and cyclohexane, alkyl-substituted cycloaliphatic hydrocarbons such as methylcyclopentane, methylcyclohexane, and methylcyclooctane, aromatic hydrocarbons such as benzene, hydroaromatic hydrocarbons such as decalin and tetralin, alkyl-substituted aromatic hydrocarbons such as toluene and xylene, halogenated aromatic hydrocarbons such as chlorobenzene, and linear and cyclic ethers such as the various dialkyl ethers, polyethers, particularly diethers, and tetrahydrofuran. Suitable hydrogenation catalysts will usually be prepared by combining the catalyst components in a separate vessel prior to feeding the same to the hydrogenation reactor.

Additional teachings to hydrogenation processes and catalysts are disclosed in U.S. Pat. Nos. 4,284,835 and 4,980,331, both of which are incorporated herein by reference in their entirety.

The dendritic polymer of the present disclosure is particularly useful as an additive to modify on the processing/performance of conventional polymers, particularly polyethylenes such as LDPE, LLDPE, MDPE, and HDPE. The polymer additive is useful, for example, in fabricated polymer products such as films, foams, and molded articles. The polymer additives are also useful in the manufacture of polypropylene and end products having same. The polymer additive is also useful in the manufacture of EPDM elastomers and their end products.

In a use as an additive, the dendritic polymer is typically present at up to 25 wt % based on the total weight of the dendritic polymer and any other polymers present, e.g., a matrix polymer constituting a substantial proportion of a polymer blend or polymer article or product fabricated from same.

In addition to its use as an additive to other polymers, the dendritic polymer is also useful as a matrix polymer, i.e., a polymer constituting a substantial proportion of a polymer article or product.

The following are examples of the present disclosure and are not to be construed as limiting.

Figure 2:
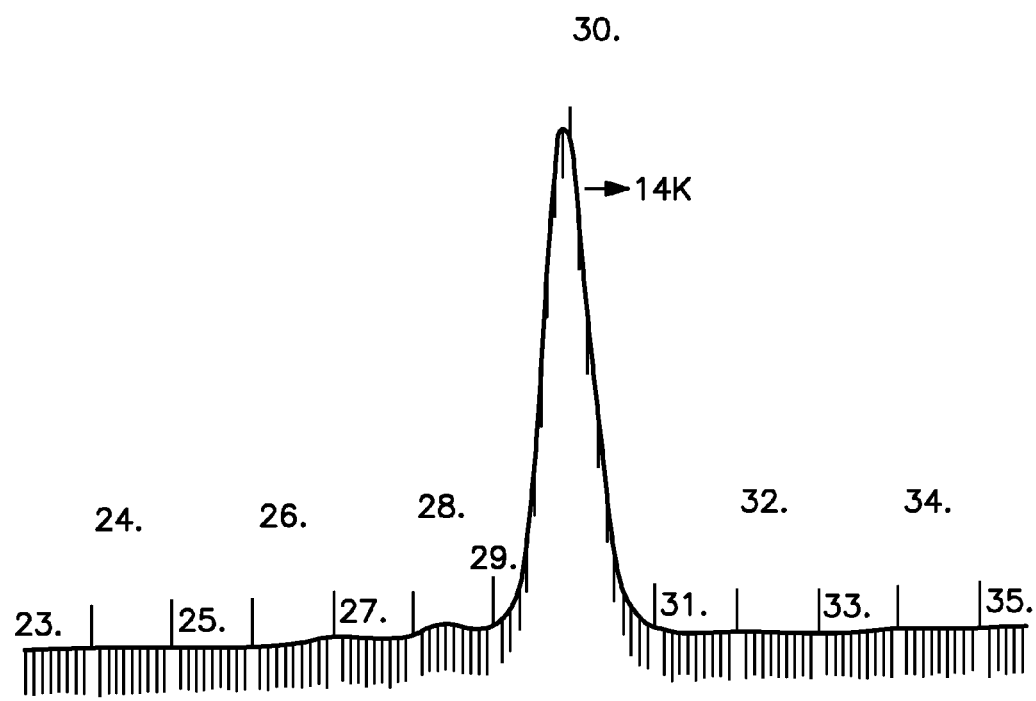
FIG. 2 is a representation of a chromatogram of a multilithiated linear PBd polymer.
Figure 3:
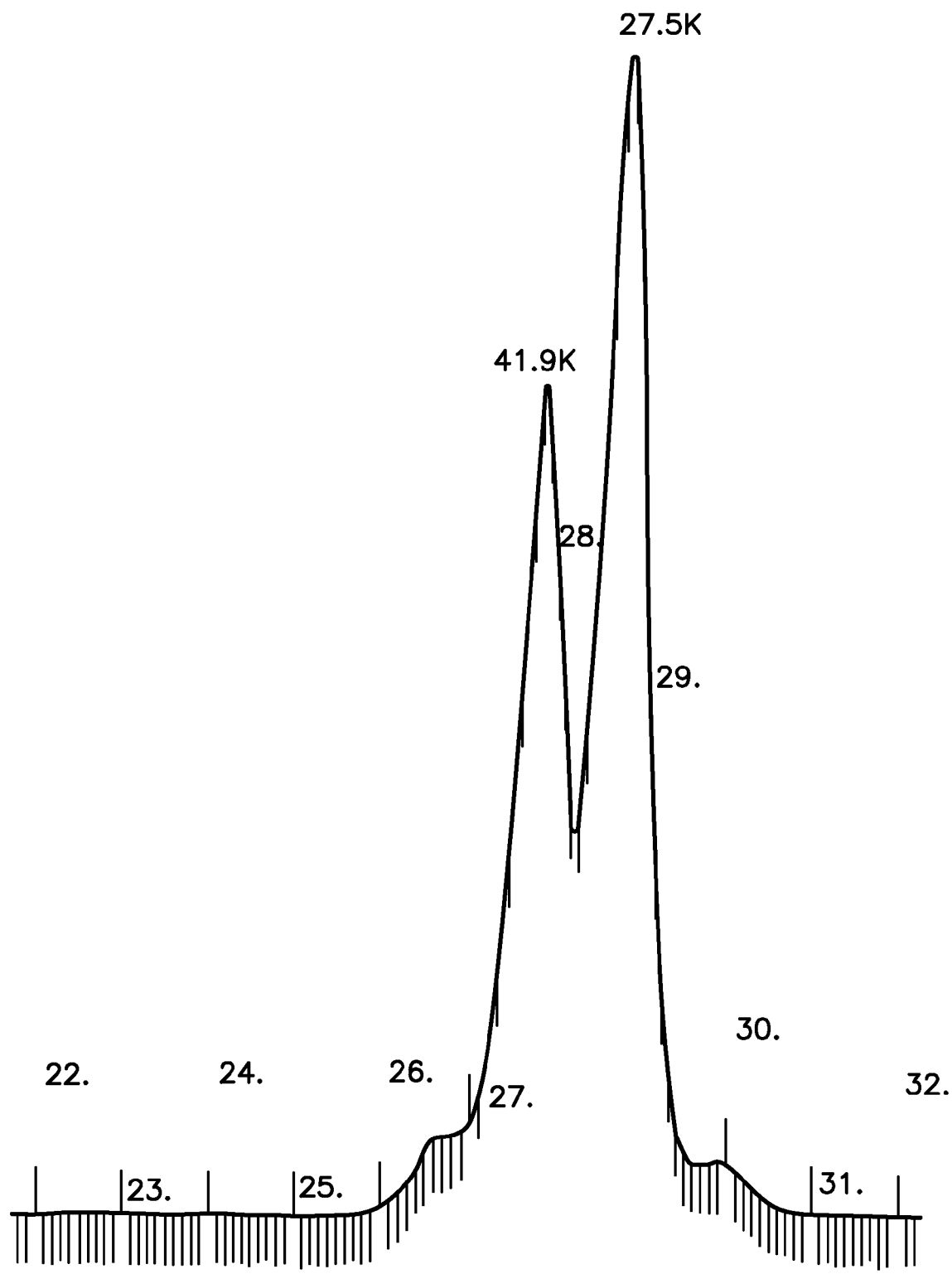
FIG. 3 is a representation of a chromatogram of a branched PBd polymer after graft polymerization of the multilithiated PBd polymer.
Figure 4:
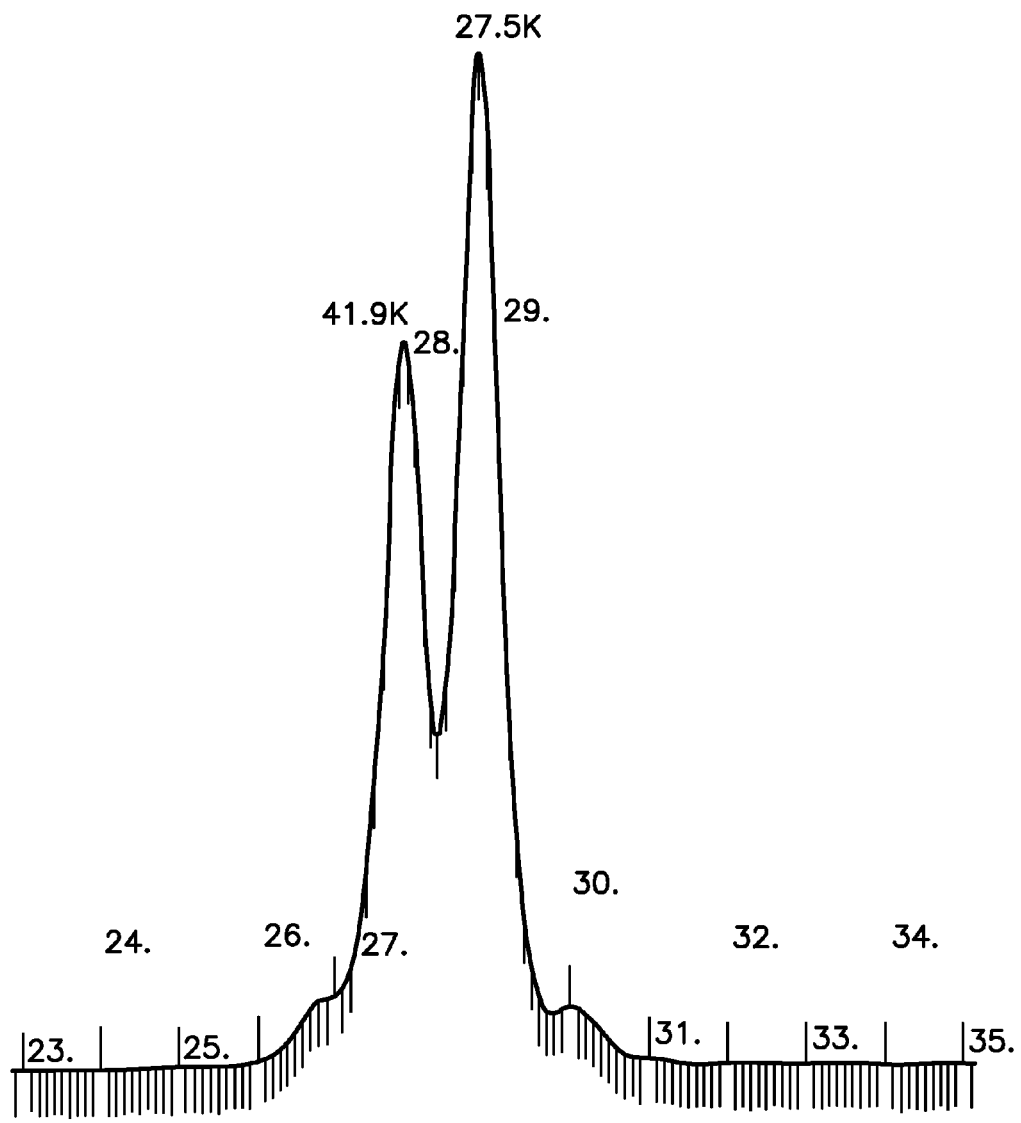
FIG. 4 is a representation of a chromatogram of a multilithiated branched PBd after a second lithiation.
Figure 5:
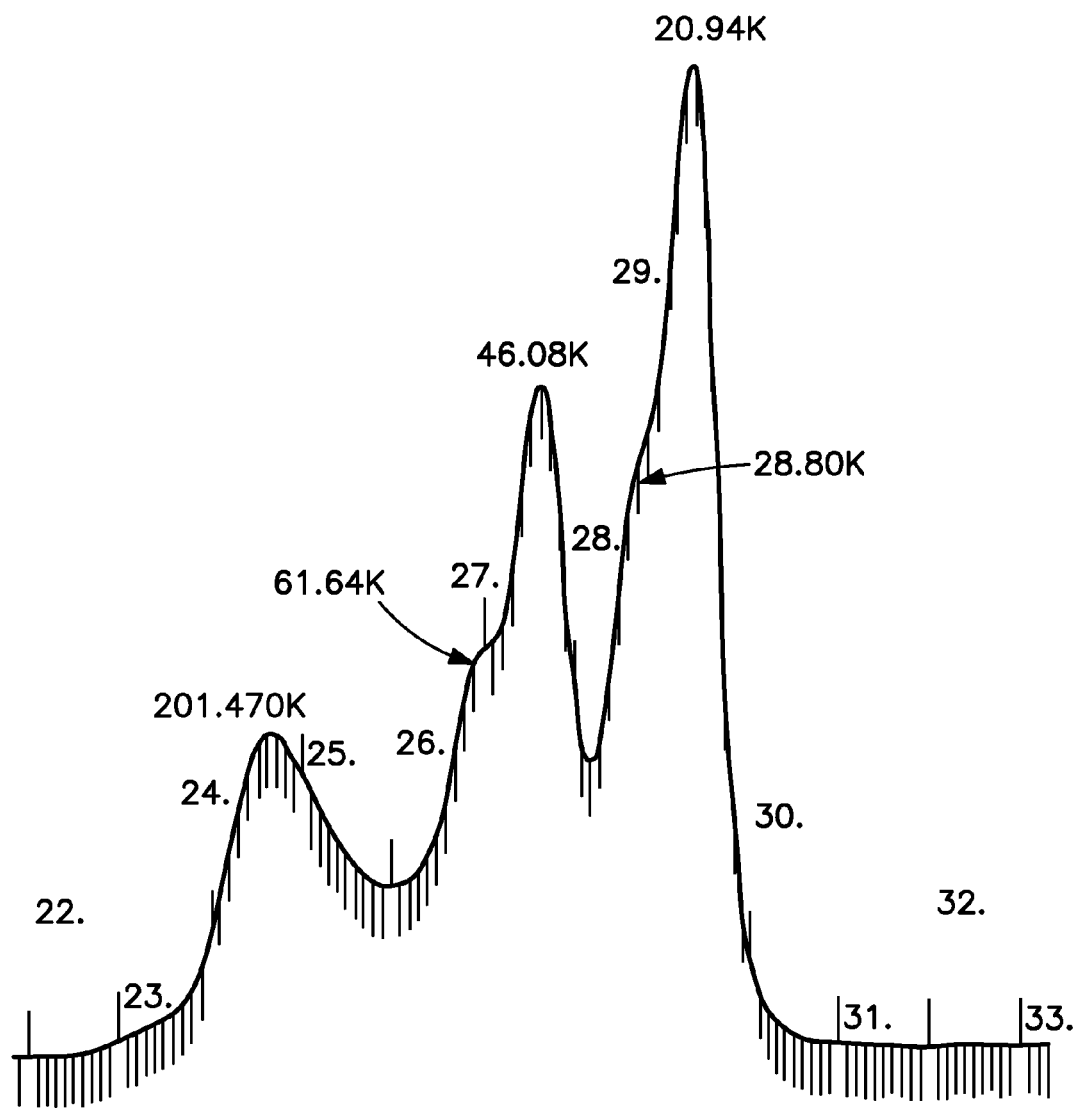
FIG. 5 is a representation of a chromatogram of the branched PBd polymer after a second graft polymerization.
Figure 6:
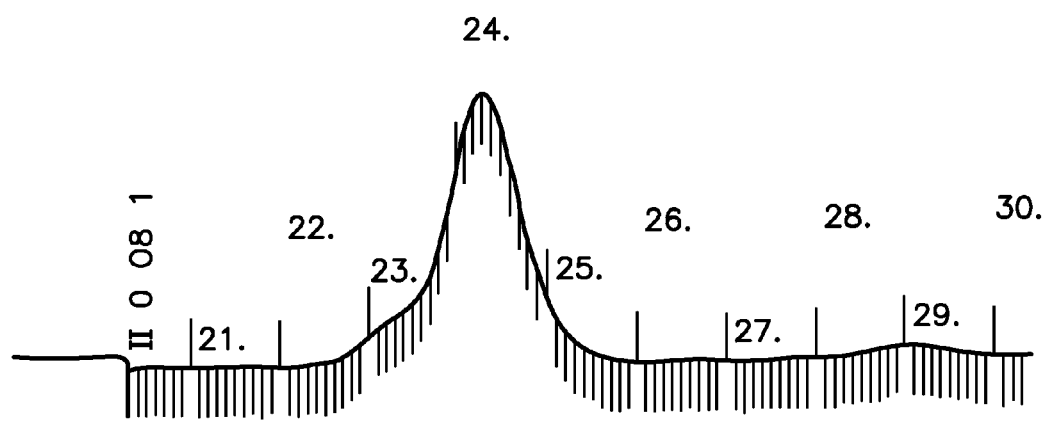
FIG. 6 is a representation of a chromatogram of the final fractionated hyperbranched PBd polymer.

EXAMPLES 1 gram of butadiene was left to react with 10-4 mol of s-BuLi in benzene (10% w/v in monomer) for 24 hours (chromatogram: FIG. 1). TMEDA and sec-BuLi were afterwards added simultaneously (TMEDA/s-BuLi=1/1), in a very dilute polymer solution (<2% w/v) and were left to react for 2 hours in order to produce three anionic sites on three allylic positions of living polybutadiene (chromatogram: FIG. 2). From the newly created anionic sites, three new polybutadiene branches (103 grams/mol each branch) were formed after the addition of 9 grams of butadiene (chromatogram: FIG. 3). Finally, new quantities of TMEDA and sec-BuLi were introduced in the solution and left to react for two more hours in order to create three new anionic sites on the allylic positions of the previous formed branches (TMEDA/sec-BuLi=1/1) (chromatogram: FIG. 4). Another 24.5 grams of butadiene were added in order to form 6 more branches of 103 grams/mol molecular weight (chromatogram: FIG. 5). Since no termination was conducted between the lithiation steps, the initial polymer chain as well as the branches remained "living" through the whole process, increasing their molecular weights with every new addition of monomer. As a result, there was only partial control on the final molecular weight of the polymers produced, even though all existent "living" anionic sites were taken into consideration in every step. In all chromatograms, the lower molecular weight extra peak was due in the left over sec-BuLi. All SEC experiments were run in THF at 30° C. calibrated with PS standards (FIGS. 1-6).

Figure 7:
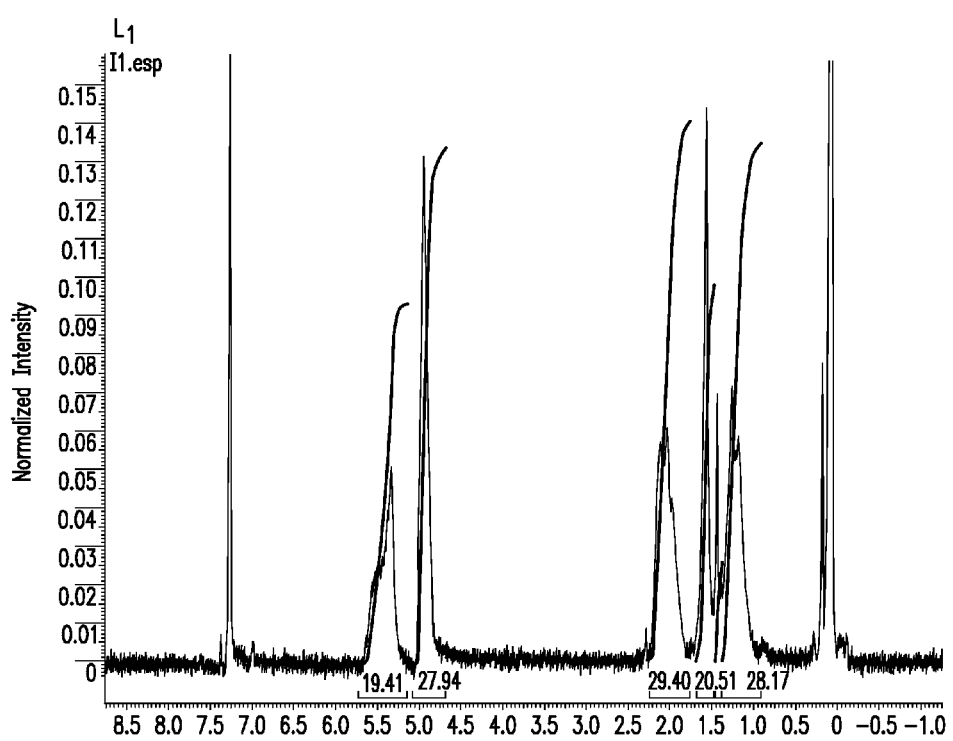
FIG. 7 is a representation an H NMR spectrum of the final hyperbranched PBd.
Figure 8:
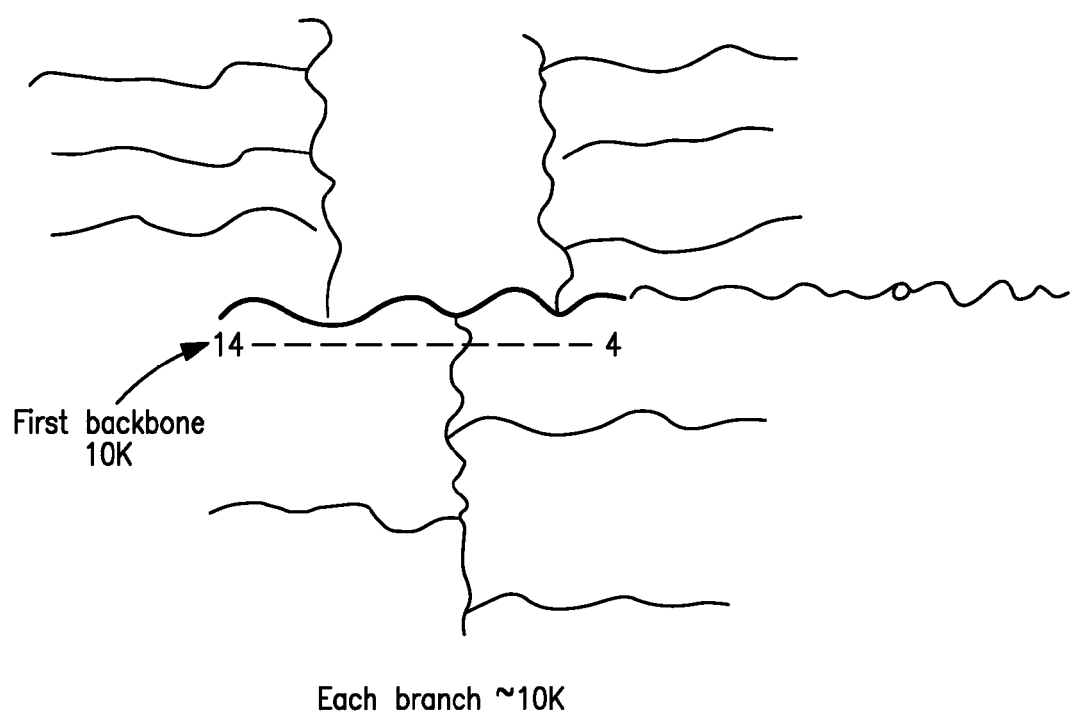
FIG. 8 is a schematic representation of the structure of the final hyperbranched PBd.

The 1,2 content of the final hyperbranched PBd was 83.7% as determined by $^1$H NMR (FIG. 7). This was then hydrogenated with tosylhydrazide, and the resulting saturated polymer had a final double bond content of less than 1% (~0.04%).

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A process for making a substantially saturated dendritic hydrocarbon polymer, comprising the steps of:
    (a) polymerizing an amount of a first alkadiene monomer under anionic conditions in the presence of a first organic monolithium initiator to produce a linear polyalkadiene having a lithiated chain end;
    (b) reacting the linear polyalkadiene with an amount of a second organic monolithium initiator in the presence of tetramethylethylene diamine to form a multilithiated polyalkadiene having both a lithiated chain end and backbone;
    (c) reacting the multilithiated polyalkadiene with an amount of a second alkadiene monomer to react with the lithiated backbone to form a branched polyalkadiene;
    (d) repeating steps (b) and (c) with the branched polyalkadiene one or more times to prepare a dendritic polyalkadiene; and
    (e) hydrogenating the dendritic polyalkadiene to form the substantially saturated dendritic hydrocarbon polymer.

2. The process of claim 1, wherein the alkadiene monomer is selected from the group consisting of 1,3-butadiene, isoprene, 2-methyl-1,3-pentadiene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, and combinations thereof.

3. The process of claim 2, wherein the first alkadiene monomer and the second alkadiene monomer are 1,3-butadiene.

4. The process of claim 1, wherein the first alkadiene monomer and the second alkadiene monomer are the same.

5. The process of claim 1, wherein the first organic monolithium initiator and the second organic monolithium initiator are the same.

6. The process of claim 1, wherein the organic monolithium initiator is selected from the group consisting of n-propyl lithium, isopropyl n-butyl lithium, tertiary butyl lithium, 2-ethyl hexyl lithium, n-decyl lithium, benzyl lithium, 4-phenyl-n-butyl lithium, and mixtures thereof.

7. A polymer blend, comprising: a matrix polymer selected from the group consisting of LDPE, LLDPE, MDPE, and HDPE and a substantially saturated dendritic hydrocarbon polymer produced by the process comprising the steps of:
    (a) polymerizing an amount of a first alkadiene monomer under anionic conditions in the presence of a first organic monolithium initiator to produce a linear polyalkadiene having a lithiated chain end;
    (b) reacting the linear polyalkadiene with an amount of a second organic monolithium initiator in the presence of tetramethylethylene diamine to form a multilithiated polyalkadiene;
    (c) reacting the multilithiated polyalkadiene with an amount of a second alkadiene monomer to form a branched polyalkadiene;
    (d) repeating steps (b) and (c) with the branched polyalkadiene one or more times to are a dendritic polyalkadiene; and
    (e) hydrogenating the dendritic polyalkadiene to form the substantially saturated dendritic hydrocarbon polymer, wherein the matrix polymer is present in a greater weight proportion than the substantially saturated dendritic hydrocarbon polymer.

8. The blend of claim 7, wherein the matrix polymer is LLDPE.

9. A fabricated article comprising a polymer blend, including: a matrix polymer selected from the group consisting of LDPE, LLDPE, MDPE, and HDPE and a substantially saturated dendritic hydrocarbon polymer produced by the process comprising the steps of:
    (a) polymerizing an amount of a first alkadiene monomer under anionic conditions in the presence of a first organic monolithium initiator to produce a linear polyalkadiene having a lithiated chain end;
    (b) reacting the linear polyalkadiene with an amount of a second organic monolithium initiator in the presence of tetramethylethylene diamine to form a multilithiated polyalkadiene;
    (c) reacting the multilithiated polyalkadiene with an amount of a second alkadiene monomer to form a branched polyalkadiene;

(d) repeating steps (b) and (c) with the branched polyalkadiene one or more times to prepare a dendritic polyalkadiene; and
(e) hydrogenating the dendritic polyalkadiene to form the substantially saturated dendritic hydrocarbon polymer,
wherein the matrix polymer is present in a greater weight proportion than the substantially saturated dendritic hydrocarbon polymer.

* * * * *